United States Patent
Bauer

[11] 3,906,137
[45] Sept. 16, 1975

[54] LAMINATE HAVING A COMPRESSED FOAM CORE

[75] Inventor: Peter Bauer, Darmstadt, Germany

[73] Assignee: Rohm GmbH, Darmstadt, Germany

[22] Filed: Jan. 21, 1974

[21] Appl. No.: 435,022

Related U.S. Application Data

[63] Continuation of Ser. No. 233,243, March 9, 1972, abandoned.

[30] Foreign Application Priority Data

Mar. 25, 1971 Germany.............................. 2114524

[52] U.S. Cl. ................ 428/315; 428/313; 428/322; 428/910; 156/196; 156/247; 156/256; 156/297; 264/321

[51] Int. Cl.². B32B 3/26; B29D 27/00; B32B 31/04

[58] Field of Search .......................... 161/159–161, 161/124, 411, 402; 156/297, 78, 196, 242, 256, 312; 264/45, 321, 53

[56] References Cited
UNITED STATES PATENTS

| | | | |
|---|---|---|---|
| 2,493,032 | 1/1950 | Rheinfrank | 161/169 |
| 2,659,935 | 11/1953 | Hammon | 264/321 |
| 3,082,483 | 3/1963 | Bickford | 161/159 |
| 3,367,818 | 2/1968 | Voelker | 161/161 |
| 3,431,164 | 3/1969 | Gilbert | 264/53 |
| 3,432,380 | 3/1969 | Weber | 264/321 |
| 3,542,703 | 11/1970 | DeBrunner | 161/227 |
| 3,616,112 | 10/1971 | Desai | 161/159 |
| 3,734,811 | 5/1973 | Small et al. | 161/159 |

OTHER PUBLICATIONS

Whittington's Dictionary of Plastics, Tecnomic Publishing Co., Inc. U.S.A., Copyright 1968 p. 238.

Primary Examiner—George F. Lesmes
Assistant Examiner—Stanley S. Silverman
Attorney, Agent, or Firm—Curtis, Morris & Safford

[57] ABSTRACT

Laminates comprising two cover layers and a core of a thermoelastic foam, such as of a polymethacrylimide resin, said foam being compressed while in a thermoelastic condition and cooled below the softening point while maintaining compressive pressure thereon. The core is arranged in the laminate so that the compression direction is parallel to the plane of the cover layers, since maximum strength properties are developed in the compressed foam in directions perpendicular to the compression direction.

3 Claims, 4 Drawing Figures

PATENTED SEP 16 1975　　　　　　　　　3,906,137

LAMINATE HAVING A COMPRESSED FOAM CORE

This is a continuation of application Ser. No. 233,243, filed Mar. 9, 1972, now abandoned.

The present invention relates to laminates having a compressed foam core and to methods of making the same.

The resistance of foamed materials to tension, compression, torsion, and the like generally increases with increasing density of the foam. If the foamed materials are employed in construction, their required minimum density is determined by the load they must carry. The density of the foam determines the total weight of the construction and the use of conventional materials sets a limit on the reductions in weight which are possible. This limit can only be exceeded if foams having an improved relationship between their strength properties and their density can be employed.

An object of the present invention is the preparation of laminates from such foams having improved strength properties in comparison with conventional foams of the same density and of the same basic material.

The solution of this problem rests on the circumstance that a material is only in the rarest instances subjected to high-demand loading in all three directions. Even a foam having anisotropic strength properties in which the relationship between strength and density were improved in one or two dimensions would permit a smaller total construction weight than would an isotropic foam of higher density having the same strength properties in all three dimensions.

It is already known in the art, for example from German Pat. publication No. 1,069,864, German petty Pat. No. 1,849,035, and U.S. Pat. No. 3,504,064 to heat and compress foamed resin bodies in order to impart increased strength to them. The resulting bodies, in the form of the thin films or sheets, have been employed as caulking, sealing, and insulating bodies, for example by incorporation in laminar structures formed with one or two cover layers on either side of the foamed layer. In these cases, foam is incorporated between these cover layers such that the direction of compression of the foam is perpendicular to the plane of the layers. However, the strength of the foam in the compression direction is at best only minimally increased, so that these prior art structures do not utilize the considerably improved mechanical strength of the foam in planes perpendicular to the direction of compression.

A feature of the present invention is a laminate comprising two cover layers or load-bearing layers and a foam core therebetween. According to the invention, the core comprises a thermoelastic foam which has been compressed while in a thermoelastic condition and then cooled below the softening temperature under maintenance of the pressure. The foam core is so arranged in the laminate that the direction of compression of the foam is in a plane parallel to the plane of the covering layers.

A foam prepared in the manner described above has a higher density than the corresponding starting material, but nevertheless the strength properties of the foam in a direction perpendicular to the direction of compression are considerably higher than in an isotropic foam of the same density.

The tensile strength and elastic modulus of a compressed polymethacrylimide foam perpendicular to the compression direction are compared with the same properties of a non-compressed foam of similar density in following Table I.

TABLE I

| Density (kg/cm³) | | Tensile Strength (kgf/cm²) | Modulus of Elasticity (kgf/cm²) |
|---|---|---|---|
| 80 | compressed | 32 | 1600 |
|  | non-compressed | 27 | 1200 |
| 140 | compressed | 58 | 3000 |
|  | non-compressed | 48 | 1200 |
| 200 | compressed | 92 | 4400 |
|  | non-compressed | 73 | 3200 |

Reference is made here to the accompanying drawings in which FIG. 1 is a perspective view of a compressed thermoelastic foam sheet;

Figure 1:
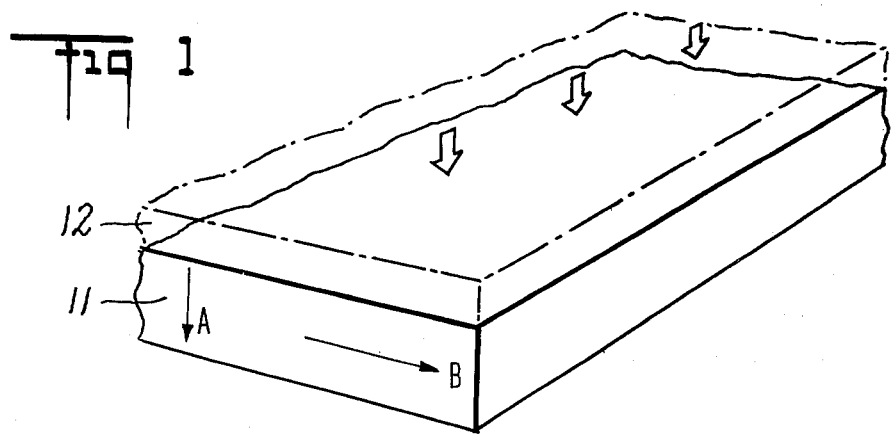

In particular, FIG. 1 shows compressed foam layer 11 (solid lines) prepared by compressing an uncompressed thermoelastic foam body 12, the dimensions of which are suggested by the broken lines, at a temperature above the softening point of the foam and maintaining the compression until the body has cooled below the softening point. The direction of compression is indicated by the arrows a.

Figure 2:
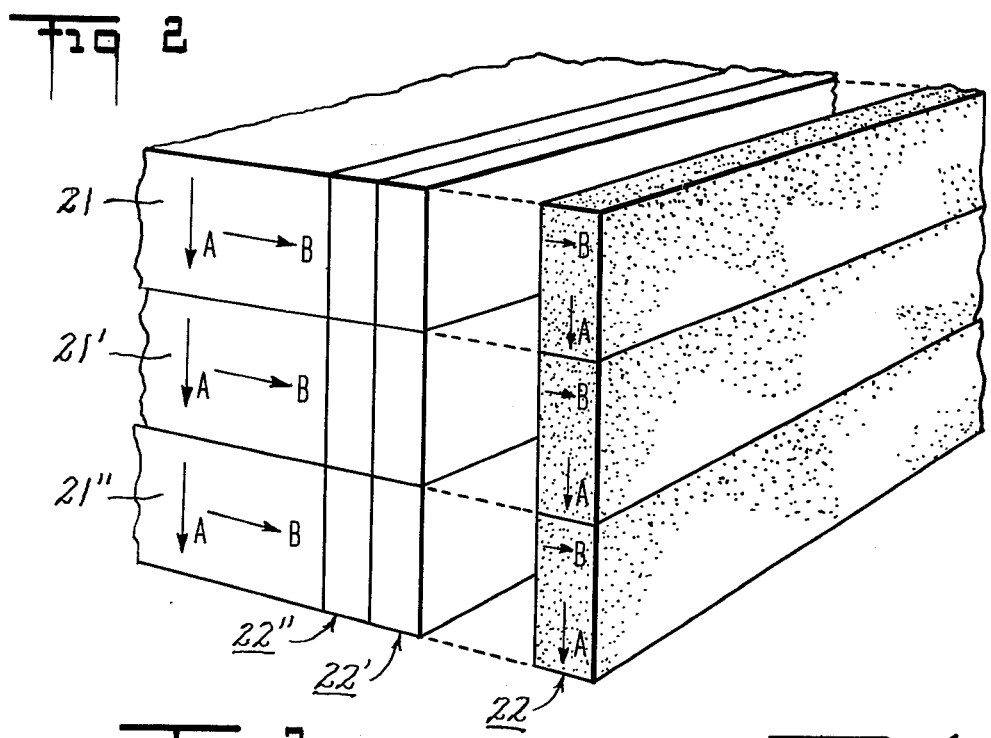
FIG. 2 is a perspective view of a block comprising a plurality of adhered compressed thermoelastic foam sheets from which slices are cut in a direction perpendicular to the adhered surfaces.

In FIG. 2, a plurality of such compressed thermoelastic foam layers 21, 21', 21'' are formed into a block, for example using a suitable adhesive. Slices 22, 22', 22'' are cut from the block perpendicular to the adhered surfaces, i.e. in the direction of compression of the layers 21, 21', 21''.

Figures 3, 4:
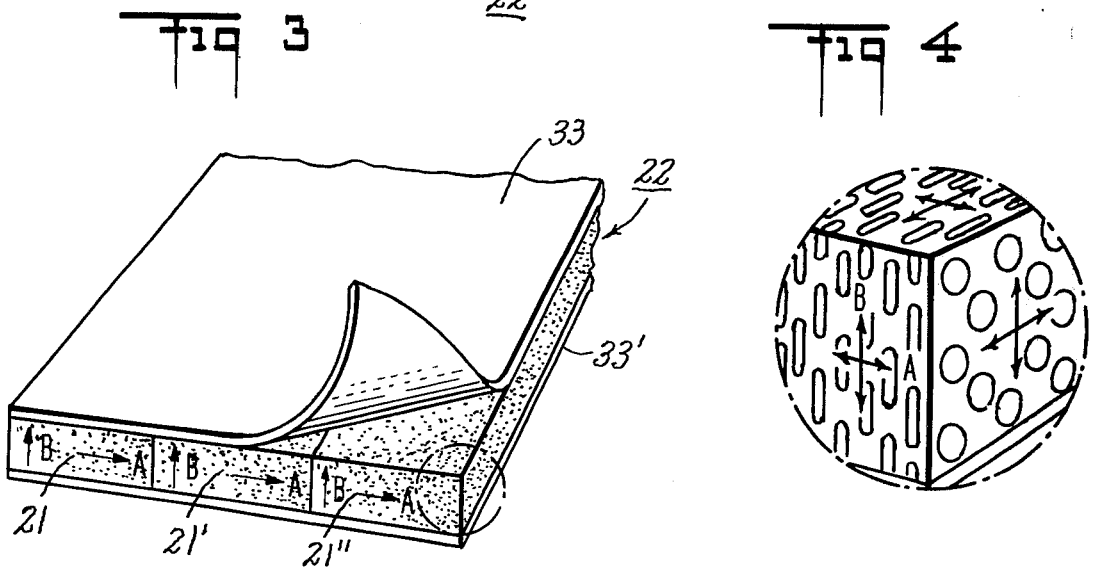
FIG. 3 is a perspective view of a laminate comprising two covering or outer load bearing layers and, as a core, a slice of the foam block of FIG. 2.
FIG. 4 is an enlarged sectional view of the foam structure in said core.

FIG. 3 shows slice 22 of FIG. 2 laminated between outer layers 33, 33', which may be of metal or plastic, for example. The direction of compression of the foam layers 21, 21', 21'' in slice 22 lies parallel to the plane of cover layers 33, 33' and is indicated in FIGS. 2 – 4 by the arrows A.

This can be visually confirmed by examination of the foam structure. As shown in FIG. 4, the originally roughly spherical cells of the uncompressed foam are flattened in dimensions perpendicular to the direction of compression and assume an oblate spheroidal shape. In the direction of compression, the cells remain roughly circular in section.

Thermoelasticity, as a property of plastics, is the rubber-like elasticity resulting in a rigid plastic from an increase in temperature. "Thermoelastic" foams or foams made from thermoelastic resins, as this term is particularly used in the present specification and claims, are those in which the foam does not flow plastically when the softening temperature of the resin is exceeded, but rather develops a restoring force on deformation such that when the deforming force is removed above the softening point the material assumes its original form. However, if application of the deforming force is continued until the foam is cooled under its softening temperature, then the foam holds the deformation even after removal of the deforming force. The individual cells of the original foam, which are roughly spherical in form, are lenticular in the compressed material. A foam body prepared in this way will re-expand if it is warmed above its softening point in an unloaded condition.

In contrast, if deformation takes place within the thermoplastic region of the resin, no restoring forces are formed and the shape arising from the deformation is retained even if the material is rewarmed to higher temperatures. The desired lenticular structure of foam cells is not obtained under such conditions.

Thus, for the preparation of laminates according to the present invention, those foams are particularly suitable which, on heating, enter or pass through a well-defined thermoelastic condition. Foams of polyvinyl chloride or polymethyl methacrylate are of this kind, for example: in polyvinyl chloride, the thermoelastic region is between about 80°C. and 150°C., while in high molecular weight polymethyl methacrylate the region is between about 120°C. and 170°C. In contrast, in foams of more or less crystalline synthetic resins, such as polyolefins, the thermoelastic temperature region is very narrow or absent altogether. The foamed materials for the purposes of the present invention should exhibit thermoelastic properties in at least a narrow temperature region and this temperature region should be capable of being exactly maintained during processing. The transitions from the solid state into the thermoelastic region, and from the latter into the thermoplastic region, are continuous and the regions themselves are not always clearly defined. If foams of the crystalline plastics described above are compressed at elevated temperatures, any improvement in their strength properties over the strength of a non-compressed foam of the same material of the same density will be observed only to the extent that the plastic shows thermoelastic behavior under the processing conditions.

Foams of highly cross-linked resins cannot be employed according to the present invention since they do not become thermoelastic on warming. This is true particularly of phenolic resin foams, urea formaldehyde foams, and polyurethane foams. In contrast, weakly cross-linked foams, or foams which have very high softening points and which can no longer convert to a thermoplastic condition, can in most cases be compressed at sufficiently high temperatures. The increase in strength in these materials is particularly great.

Polymethacrylimide foams are exemplary of foamed resins of this type, having a thermoelastic region between about 170°C. and 200°C. As discussed for example in U.S. Pat. No. 3,627,711, such resins comprising polymethacrylimide groups can be prepared by the copolymerization of methacrylic acid with methacrylonitrile or methacrylamide, by the copolymerization of methacrylamide with a methacrylate ester, or by the homopolymerization of methacrylic acid (in the presence of ammonia) or of methacrylamide. Formamide, monoalkyl formamides, urea, dialkyl ureas, or other known foaming agents can be incorporated into these polymers to render them foamable. Since the strength of these foams, after complete foaming, still clearly increases on further heating to about 200°C., it is particularly desirable to compress such a foam directly after foaming, without intervening cooling, and to permit final hardening of the foam in the compressed condition. However, for these materials it is also possible to reheat the finally-hardened foam and then to compress it.

The degree of compression required is not limited to any particular regions of the original and final density. For example, the uncompressed foams may have densities from 20 – 600 grams per liter and — depending on the desired increase in strength — can be compressed to 20 – 80 percent of their original thickness. Since high-density foams, when compressed, have densities which approach those of corresponding solid construction materials and can thus offer relatively little saving in weight in comparison with the solid materials, the use of light foams having a density between about 30 and 200 grams per liter is preferred in practice. These are suitably compressed to half of their original thickness or less.

The foams employed as starting materials are generally prepared in the form of relatively thin sheets, Compression of such sheets is possible in practice only in a direction perpendicular to the sheet surfaces (i.e. the direction A as seen in FIG. 1). The resulting sheets then show improved strength properties only in dimensions parallel to the sheet surface (i.e. the direction B indicated by the arrows B in FIG. 1). Foamed sheets having improved strength in a direction perpendicular to the sheet surface can, however, be prepared by forming a plurality of previously compressed sheets into a block, for example by adhesion, (in the relation shown in FIG. 2) and cutting layers from the block in a direction perpendicular to the adhered surfaces (i.e. in directions parallel to the direction of compression A). For further strengthening of such structures, woven or non-woven textile fibers or mineral fibers can be imbedded in the adhesive layers.

The foam core of the laminates according to the present invention is so arranged that the core exhibits maximum strength in a direction B perpendicular to the plane of the outer cover (or load-bearing) layers. Since the direction of increased strength B is always perpendicular to the direction of compression, then the direction of compression A of the foam in such structures is parallel to the plane of the covering layers. The core of the laminates of the present invention is as a rule prepared from foam plates of the type described above which are prepared from a block of adhered compressed foam sheets which have been sliced perpendicular to the direction of compression.

These cores are fashioned into laminates in the usual way, for example by adhering to their surfaces cover layers which are either pre-formed, for example from synthetic resins, or are formed in situ from liquid casting resins, for example those comprising unsaturated polyesters, acrylic plastics, or epoxy resins. The plastic cover layers, whether pre-formed or formed in situ, may also contain glass fiber sheets or other woven or non-woven webs. Cover layers of high strength, such as of metal, give particularly compression-resistant and bending-resistant laminar elements.

Foam cores comprising a polymethacrylimide foam offer the special advantage that they not only permit the attainment of exceptionally high compression resistance, but are also resistant to all known liquid casting resins and to solvent-containing adhesives.

A better understanding of the present invention and of its many advantages will be had by referring to the following specific Example given by way of illustration.

EXAMPLE

A commercial polymethacrylimide foam sheet having an overall density of 50 kg/m³ and outer dimensions of 2000 × 1000 × 60 mm is prepared from 30 parts by weight of methacrylonitrile, 70 parts by weight of methacrylimide, and 8.2 parts of formamide by polymerization for 19 hours at 45°C. in the presence of 0.1 part of t-butyl perpivalate and 0.05 part of benzoyl peroxide, and then foaming at 200°C. for 30 minutes, as in Example 3 of U.S. Pat. No. 3,627,711. The sheet is then heated to 200°C. and compressed in an hydraulic plate-press from a thickness of 60 millimeters to a thickness of 22 millimeters. After cooling to about 120°C., the compressed sheet is taken from the press and the difficulty adherable smooth skin on the foam is removed from both sides by grinding or planing. The overall density of the compressed sheet is now about 135 kg/m³ and its thickness after removal of the surface film is about 20 mm. The resistance to compression in the direction of compression, i.e. perpendicular to the surface of the sheet, is about 11 kgf/cm². In contrast, a resistance to compression of 33 kgf/cm² is measured perpendicular to the direction of compression, i.e. parallel to the sheet surfaces.

The sheet is next divided into five portions each 2000 × 200 × 20 mm in size and the five sheets are adhered with an epoxy resin adhesive in a press to form an element about 100 mm in thickness. Longitudinal sheets 2000 × 100 × 20 mm in dimension are cut from this block perpendicular to the adhesive layers. These sheets then are used as the core of laminar elements. As the outer layers of such a laminar element, aluminum plates 2 mm in thickness are employed and are adhered to the core with an epoxy resin adhesive in a press at about 150°C.

Alternatively, a laminate can be formed from the foam core described above by coating the outer surfaces thereof with a glassfiber-reinforced epoxy casting resin commercially available under the tradename "Araldit LY 556". A film of the casting resin, containing a CIBA catalyst known by the tradename HT 972, is applied to each surface of the foam core and is then cured in situ by heating to a temperature of 150°C for a period of 1 hour. The glass interlayer on each surface consists of two woven rovings (800 g/m²). With an application of about 1,000 g/m² resin to each surface and a curing pressure of about 2 kgf/cm² the cured glassfiber-reinforced outer cover layer will be about 1.5 mm thick.

What is claimed is:

1. The method of making a laminar element which comprises uniformly compressing a body of thermoelastic polyvinyl chloride, polymethylmethacrylate, or polymethacrylimide foam of predetermined thickness in a first predetermined compression direction throughout its entire thickness while in a thermoelastic condition and maintaining the compressive pressure while cooling below the softening point, whereby the strength properties of the compressed foam are anisotropically improved in a direction perpendicular to the compression direction; positioning a plurality of such compressed sheets in superimposed relation to one another, the compression directions thereof being perpendicular to the faces of the sheet; forming a foam laminate from said superimposed sheets with the compression directions of the sheets being located perpendicular to the faces of the resulting foam laminate; separating a slab from said foam laminate in a direction perpendicular to the direction of compression; and then incorporating said slab between two loadbearing cover layers with the compression directions of said sheets being located parallel to the plane of said cover layers and the improved strength direction of said sheets being located perpendicular to the planes of the cover layers.

2. The method as in claim 1 wherein said loadbearing cover layers are formed in situ on said foam core from a liquid casting resin.

3. A laminar element made by the method of claim 1.

* * * * *